(12) United States Patent
Diop et al.

(10) Patent No.: US 10,025,559 B2
(45) Date of Patent: Jul. 17, 2018

(54) PROTECTION OF A MODULAR EXPONENTIATION CALCULATION

(71) Applicant: STMicroelectronics (Rousset) SAS, Rousset (FR)

(72) Inventors: Ibrahima Diop, Marseilles (FR); Yanis Linge, Fuveau (FR); Pierre-Yvan Liardet, Peynier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 15/442,322

(22) Filed: Feb. 24, 2017

(65) Prior Publication Data
US 2018/0060040 A1    Mar. 1, 2018

(30) Foreign Application Priority Data
Aug. 23, 2016    (FR) ..................................... 16 57861

(51) Int. Cl.
*G06F 7/58*    (2006.01)
*G06F 7/72*    (2006.01)
*G06F 21/72*    (2013.01)

(52) U.S. Cl.
CPC ................ *G06F 7/723* (2013.01); *G06F 7/58* (2013.01); *G06F 7/722* (2013.01); *G06F 21/72* (2013.01)

(58) Field of Classification Search
CPC ............. G06F 7/723; G06F 7/58; G06F 7/722

(Continued)

(56) References Cited

U.S. PATENT DOCUMENTS 6,008,075 A * 12/1999 Lien .................. H01L 21/76838
257/E21.575
8,139,763 B2     3/2012 Boscher et al.
(Continued)

FOREIGN PATENT DOCUMENTS

FR    2 875 355 A1    3/2006
GB    2 399 904 A    9/2004

OTHER PUBLICATIONS

Clavier et al., "Horizontal Correlation Analysis on Exponentiation," *Twelfth International Conference on Information and Communications Security*, Barcelona, Spain, Dec. 2010, 19 pages.
(Continued)

*Primary Examiner* — Tan V. Mai
(74) *Attorney, Agent, or Firm* — Seed IP Law Group LLP

(57) ABSTRACT

A method of protecting a modular exponentiation calculation on a first number and an exponent, modulo a first modulo, executed by an electronic circuit using a first register or memory location and a second register or memory location, successively including, for each bit of the exponent: generating a random number; performing a modular multiplication of the content of the first register or memory location by that of the second register or memory location, and placing the result in one of the first and second registers or memory locations selected according to the state of the bit of the exponent; performing a modular squaring of the content of one of the first and second registers or memory locations selected according to the state of the exponent, and placing the result in this selected register or memory location, the multiplication and squaring operations being performed modulo the product of the first modulo by said random number.

19 Claims, 2 Drawing Sheets

(58) Field of Classification Search
USPC .................................................. 708/250–256
See application file for complete search history.

(56) References Cited

U.S. PATENT DOCUMENTS

| | | | |
|---|---|---|---|
| 9,014,368 B2* | 4/2015 | Teglia | G06F 7/723 380/28 |
| 2005/0078821 A1 | 4/2005 | Jin et al. | |
| 2009/0067617 A1 | 3/2009 | Trichina et al. | |
| 2009/0092245 A1 | 4/2009 | Fumaroli et al. | |
| 2014/0281573 A1 | 9/2014 | Jaffe | |
| 2015/0063561 A1 | 3/2015 | Teglia | |

OTHER PUBLICATIONS

Feix et al., "Side-Channel Analysis on Blinded Regular Scalar Multiplications," *Proceedings of INDOCRYPT 2014*, Jan. 1, 2014, 25 pages.

French Search Report, dated Jul. 31, 2017, for French Application No. 1657860, 8 pages.

French Search Report, dated Jun. 23, 2017, for French Application No. 1657861, 8 pages.

Joye et al., "The Montgomery Powering Ladder," *Cryptographic Hardware and Embedded Systems International Workshop 2002*, Aug. 13, 2002, 12 pages.

Lesavourey et al., "Efficient Randomized Regular Modular Exponentiation using Combined Montgomery and Barrett Multiplications," *Thirteenth International Conference on Security and Cryptography*, Lisbon, Portugal, Jul. 2016, 9 pages.

Choi et al., "An Improved Square-always Exponentiation Resistant to Side-channel Attacks on RSA Implementation," *Intelligent Automation & Soft Computing* 22(3):353-363, 2016.

French Search Report, dated Mar. 9, 2018, for French Application No. 1757037, 8 pages.

Ha et al., "Power Analysis Attacks on the Right-to-Left Square-Always Exponentiation Algorithm," *Journal of Internet Services and Information Security* 4(4):38-51, 2014.

\* cited by examiner

PROTECTION OF A MODULAR EXPONENTIATION CALCULATION

BACKGROUND

Technical Field

The present disclosure generally relates to electronic circuits and, more specifically, to circuits executing modular exponentiation operations. The present disclosure more specifically relates to the protection of such calculations against attacks aiming at discovering quantities manipulated by the calculations.

Description of the Related Art

In many applications, electronic circuits implement algorithms of encryption, authentication, signature calculation, and more generally algorithms manipulating data, called secret data, that is, the access to which is desired to be reserved to certain users or circuits. Among such algorithms, some use modular exponentiation operations, for example, RSA-type algorithms.

There exist many methods, called attacks, to attempt discovering or pirating secret data manipulated by such calculations. Among such attacks, so-called side channel attacks, use indirect information such as the circuit power consumption (SPA, DPA attacks), its radiation, etc. The interpretation of this information gives the pirate information relative to the secret data.

Among side-channel attacks, one can in particular distinguish attacks called vertical and attacks called horizontal. Vertical attacks comprise using the variations of a same secret quantity on a plurality of successive traces, for example, of power consumptions, recorded by having made different assumptions as to the secret quantity. Horizontal attacks comprise exploiting the different operations of a same trace and relative to the secret quantities. The countermeasures which are generally efficient against vertical side channel attacks are generally not efficient against horizontal attacks.

BRIEF SUMMARY

In an embodiment, a method comprises: performing, using an electronic circuit, a modular exponentiation calculation on a first number and an exponent, modulo a first modulo by, for each bit of the exponent: generating a random number; performing a modular multiplication of content of a first memory location by content of a second memory location, and placing a result in one of the first and second memory locations selected according to a state of the bit of the exponent; and performing a modular squaring of the content of one of the first and second memory locations selected according to the state of the exponent, and placing the result in this selected register or memory location, the multiplication and squaring operations being performed modulo a product of the first modulo and said random number. In an embodiment, a result of the modular exponentiation calculation is contained in said first memory location. In an embodiment, the method comprises: initializing the first memory location to value 1; and initializing the second memory location to a value of the first number. In an embodiment, the first memory location is a first register of the electronic circuit and the second memory location is a second register of the electronic circuit. In an embodiment, the method comprises processing a transaction based on a result of the modular exponentiation calculation.

In an embodiment, a device comprises: one or more memories; and processing circuitry, which, in operation, performs a modular exponentiation calculation on a first number and an exponent, modulo a first modulo by, for each bit of the exponent: generating a random number; performing a modular multiplication of content of a first memory location by content of a second memory location, and placing a result in one of the first and second memory locations selected according to a state of the bit of the exponent; and performing a modular squaring of the content of one of the first and second memory locations selected according to the state of the exponent, and placing the result in this selected register or memory location, the multiplication and squaring being performed modulo a product of the first modulo and said random number. In an embodiment, a result of the modular exponentiation calculation is contained in said first memory location. In an embodiment, the processing circuitry, in operation: initializes the first memory location to value 1; and initializes the second memory location to a value of the first number. In an embodiment, the first memory location is a first register of the one or more memories and the second memory location is a second register of the one or more memories. In an embodiment, the device comprises one or more processing cores, which, in operation, process transactions based on a result of the modular exponentiation calculation.

In an embodiment, a system comprises: one or more processing cores, which in operation, process digital data; and cryptographic circuitry, coupled to the one or more processing cores, wherein the cryptographic circuitry, in operation, performs a modular exponentiation calculation on a first number and an exponent, modulo a first modulo by, for each bit of the exponent: generating a random number; performing a modular multiplication of content of a first memory location by content of a second memory location, and placing a result in one of the first and second memory locations selected according to a state of the bit of the exponent; and performing a modular squaring of the content of one of the first and second memory locations selected according to the state of the exponent, and placing the result in this selected register or memory location, the multiplication and squaring being performed modulo a product of the first modulo and said random number. In an embodiment, a result of the modular exponentiation calculation is contained in said first memory location. In an embodiment, the cryptographic circuitry, in operation: initializes the first memory location to value 1; and initializes the second memory location to a value of the first number. In an embodiment, the first memory location is a first register of the cryptographic circuitry and the second memory location is a second register of the cryptographic circuitry. In an embodiment, the one or more processing cores, in operation, process a transaction based on a result of the modular exponentiation calculation.

In an embodiment, a non-transitory computer-readable medium has contents which cause one or more processing devices to perform a method, the method comprising: performing a modular exponentiation calculation on a first number and an exponent, modulo a first modulo by, for each bit of the exponent: generating a random number; performing a modular multiplication of content of a first memory location by content of a second memory location, and placing a result in one of the first and second memory locations selected according to a state of the bit of the exponent; and performing a modular squaring of the content of one of the first and second memory locations selected according to the state of the exponent, and placing the result in this selected register or memory location, the multiplication and squaring operations being performed modulo a product of the first modulo and said random number. In an embodiment, a result of the modular exponentiation calculation is contained in said first memory location. In an embodiment, the method comprises: initializing the first memory location to value 1; and initializing the second memory location to a value of the first number. In an embodiment, the method comprises processing a transaction based on a result of the modular exponentiation calculation.

An embodiment provides a method of calculation of a modular exponentiation by an electronic circuit, which may facilitate addressing all or part of the disadvantages of usual methods.

An embodiment provides a calculation method efficient against horizontal attacks.

An embodiment provides a method of protecting a modular exponentiation calculation on a first number and an exponent, modulo a first modulo, executed by an electronic circuit using a first register or memory location and a second register or memory location, the method successively comprising, for each bit of the exponent:
generating a random number;
performing a modular multiplication of the content of the first register or memory location by that of the second register or memory location, and placing the result in one of the first and second registers or memory locations selected according to the state of the bit of the exponent;
performing a modular squaring of the content of one of the first and second registers or memory locations selected according to the state of the exponent, and placing the result in this selected register or memory location,
the multiplication and squaring operations being performed modulo the product of the first modulo by said random number.

According to an embodiment, the result of the modular exponentiation is contained in said first register or memory location.

According to an embodiment, the method comprises of:
initializing the first register or memory location to value 1;
initializing the second register or memory location to the value of the first number.

An embodiment provides an electronic circuit capable of implementing the methods disclosed herein.

DETAILED DESCRIPTION

Figure 1:
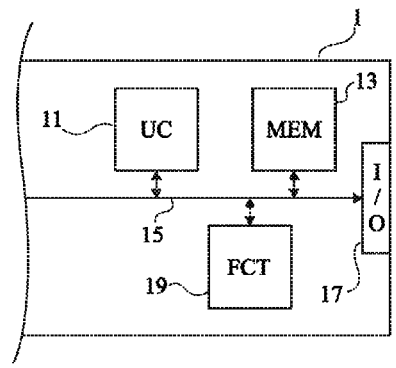
FIG. 1 schematically shows an embodiment of an electronic circuit.

The same elements have been designated with the same reference numerals in the different drawings unless the context indicates otherwise. In particular, the structural and/or functional elements common to the different embodiments may be designated with the same reference numerals and may have identical structural, dimensional, and material properties. For clarity, only those acts and elements which are useful to the understanding of the described embodiments have been shown and will be detailed. In particular, the applications of the executed calculations or of the circuits executing them have not been detailed, the described embodiments being compatible with usual applications.

FIG. 1 very schematically shows an embodiment of an electronic circuit 1 of the type to which the embodiments which will be described apply.

Circuit 1 comprises:
a calculation unit or circuit 11 (UC), for example, a state machine, a microprocessor, a programmable logic circuit, etc.;
one or a plurality of volatile and/or non-volatile storage areasor memories 13 (MEM) to store all or part of the data and keys;
one or a plurality of data, address, and/or control buses 15 coupled between the different elements internal to circuit 1 and an input-output interface 17 (I/O) for communicating with the outside of circuit 1.

Circuit 1 may include various other circuits according to the application (e.g., transaction processing, set-top-box controller, etc.), symbolized in FIG. 1 by a block 19 (FCT).

Modular exponentiation operations can be found in many encryption algorithms, among which, for example, the algorithm known as RSA.

A modular exponentiation comprises calculating result C of the exponentiation of a number M by an integer d (exponent) modulo N, that is, applying formula:

$$C=M^d (\bmod N).$$

Most often:
number M represents the number (or information representative of the number) which is desired to be encrypted, authenticated, signed, etc.; and
exponent d and modulo N (pair (d, N)) represent the encryption key, the authentication key, the signature key, etc. (or information representative of the key).

In the example of application to RSA encryption, the encryption key is pair (d, N) and the decryption key is a pair (d', N), where N is the encryption modulo and d' is the decryption exponent.

The calculation of the modular exponentiation by an electronic circuit (a state machine, a processor executing the method in the form of a program, a programmable logic circuit, etc.), for example, circuit 1, is most often performed by applying a so-called Montgomery powering ladder method.

Figure 2:
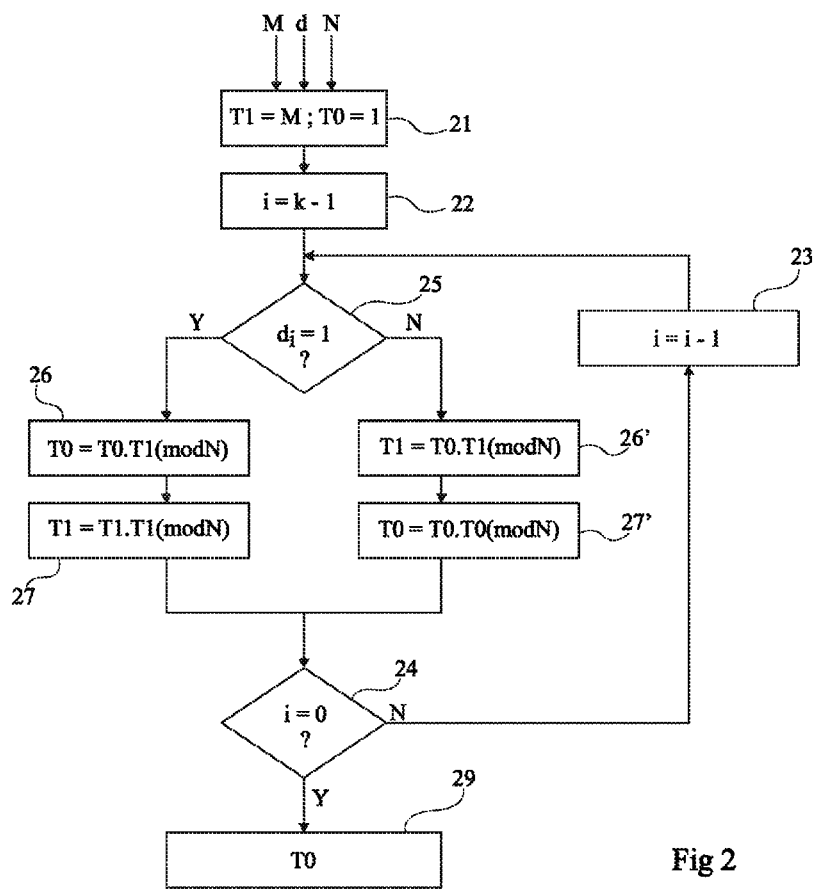
FIG. 2 shows, in the form of blocks, an embodiment of a calculation by the square-and-multiply method by Montgomery's ladder.

FIG. 2 shows, in the form of blocks, an embodiment of a calculation by Montgomery's ladder method.

The calculation uses at least two registers of circuit 1, or two memory locations, arbitrarily noted T0 and T1, on which the operations will be performed. Although, for simplification, reference will be made hereafter to registers, memory locations may also be employed.

The message, for example, number M, to be submitted to the modular exponentiation is loaded into register T1. Exponent d is read bit by bit during the calculation. Note $d_i$ each bit of exponent d, where i designates the rank from 0 to k−1, and k represents the size of exponent d.

Hereafter, for simplification, the registers and their content will be confounded, that is, when reference is made to operations on the registers, this means on the content thereof.

In a first step, (block 21, T1=M, T0=1), register T1 is thus loaded with number M and register T0 is initialized to 1.

A loop calculation on the bits of exponent d is then started. For example, a counter i is initialized to k−1 (block 22, i=k−1) and is decremented by 1 (block 23, i=i−1) each time a bit $d_i$ of the exponent is processed as long as not all the bits have been processed (block 24, i=0?).

For each iteration, that is, for each bit $d_i$, it is started by testing the value of the exponent bit (block 25, $d_i$=1?).

If current bit $d_i$ is 1 (output Y of block 25), the content of register T0 is multiplied, modulo N, by the content of register T1 and the result is placed in register T0 (block 26, T0=T0.T1 (mod N)), after which the content of register T1 is squared, modulo N, and the result is placed in register T1 (block 27, T1=T1.T1 (mod N)). This amounts to performing the square-and-multiply operation, and the product of the two registers is placed in register T0, after which the content of register T1 is replaced with its square.

If current bit $d_i$ is 0 (output N of block 25), the content of register T0 is multiplied, modulo N, by the content of register T1 and the result is placed in register T1 (block 26', T1=T0.T1 (mod N)), after which the content of register T0 is squared, modulo N, and the result is placed in register T0 (block 27', T0=T0.T0 (mod N)). This amounts to performing the square-and-multiply operation, and the product of the two registers is placed in register T1, after which the content of register T0 is replaced with its square.

As long as not all the bits of exponent d have been processed (output N of block 24), counter i is decremented (block 23) and it is returned to step 25. Once all the bits of exponent d have been processed (output Y of block 24), register T0 contains the result of the modular exponentiation (block 29, T0), that is, value C=$M^d$ (mod N).

The calculation illustrated in FIG. 2 may also be written as follows:
T0=1 (step 21)
T1=M (step 21)
For i=k−1 to 0 (steps 22 to 27):
  b=1−$d_i$
  Tb=T0.T1 (mod N)
  T$d_i$=T$d_i$.T$d_i$ (mod N)
End of loop (output Y of block 24)
Return to T0 (step 29).

To protect the calculation against attacks using a side channel analysis of the type by differential power analysis (DPA), it has already been provided to introduce a random number into modulo N at the beginning of the calculation. Thus, a random number r is drawn before the loop calculation and the multiplications of steps 26, 26', 27, and 27' are actually performed modulo rN.

Such a solution is efficient against vertical attacks. However, the random number has no effect on horizontal attacks since they exploit a single trace, and thus a single execution.

Figure 3:
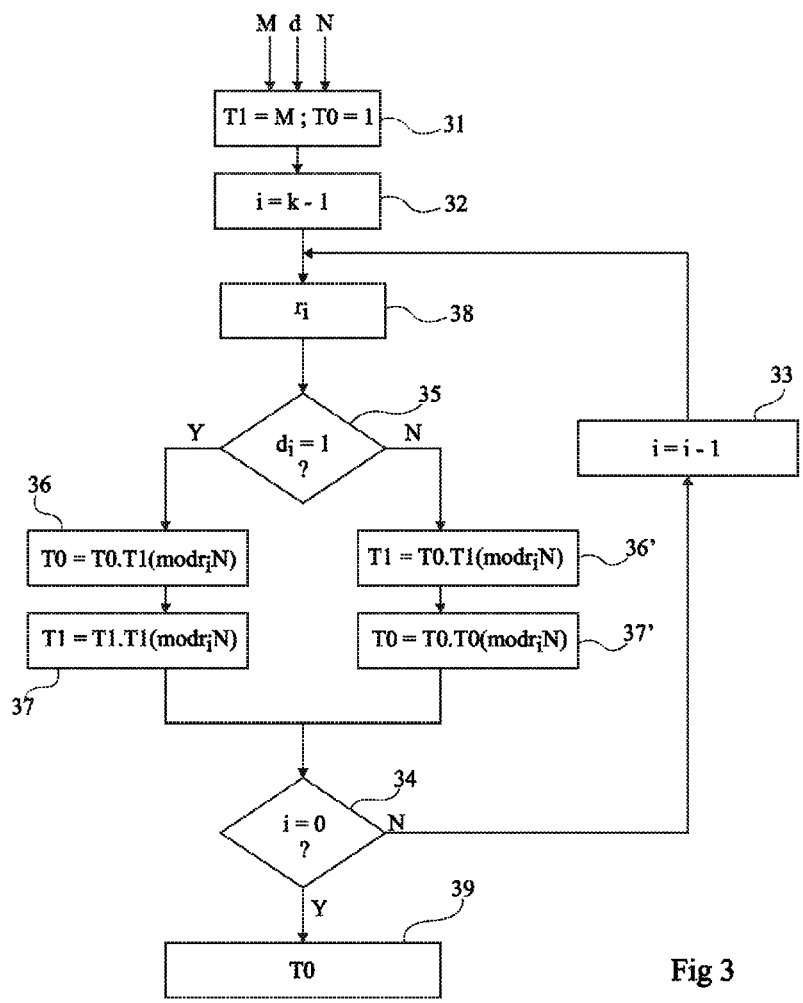
FIG. 3 shows, in the form of blocks, an embodiment of a method of protecting a modular exponentiation calculation.

FIG. 3 shows, in the form of blocks, an embodiment of a method of protecting a modular exponentiation calculation resisting horizontal side-channel attacks.

As illustrated, the method calculates value C=$M^d$ (mod N) by Montgomery's ladder method.

The calculation uses two memory locations, as illustrated two registers of circuit 1, arbitrarily called T0 and T1, on which the operations will be performed. Similarly, the message, for example, number M, to be submitted to the modular exponentiation is loaded into register T1. Exponent d is loaded into another register or is in the memory ($d_i$ representing each bit of exponent d, where i designates the rank, in the range from 0 to k−1).

In a first step, (block 31, T1=M, T0=1), register T1 is as previously loaded with number M and register T0 is initialized to 1.

A loop calculation on the bits of exponent d is then started. For example, a counter i is initialized to k−1 (block 32, i=k−1) and is decremented by 1 (block 33, i=i−1) each time a bit $d_i$ of the exponent is processed as long as not all the bits have been processed (block 34, i=0?).

For each iteration, that is, for each bit $d_i$, a random number $r_i$ is drawn (block 38, $r_i$). Number $r_i$ may comprise any number of bits, that is, selected with no connection with the modulo or the size of the other manipulated quantities. Then, the value of the exponent bit is tested (e.g., block 35, $d_i$=1?).

If current bit $d_i$ is 1 (output Y of block 35), the content of register T0 is multiplied, modulo $r_i$N, by the content of register T1 and the result is placed in register T0 (block 36, T0=T0.T1 (mod $r_i$N)), after which the content of register T1 is squared, modulo $r_i$N, and the result is placed in register T1 (block 37, T1=T1.T1 (mod $r_i$N)). This amounts to performing the square-and-multiply operation, and the product of the two registers is placed in register T0, after which the content of register T1 is replaced with its square.

If current bit $d_i$ is 0 (output N of block 35), the content of register T0 is multiplied, modulo $r_i$N, by the content of register T1 and the result is placed in register T1 (block 36', T1=T0.T1 (mod $r_i$N)), after which the content of register T0 is squared, modulo $r_i$N, and the result is placed in register T0 (block 37', T0=T0.T0 (mod $r_i$N)). This amounts to performing the square-and-multiply operation, and the product of the two registers is placed in register T1, after which the content of register T0 is replaced with its square.

As long as not all the bits of exponent d have been processed (output N of block 34), counter i is decremented and it is returned to step 38. Once all the bits of exponent d have been processed (output Y of block 34), register T0 contains the result of the modular exponentiation (block 39, T0), that is, value C=$M^d$ (mod N). Indeed, the introduction of a different modulo, for each iteration, does not change the final result once it is reduced modulo N.

The calculation illustrated in FIG. 3 may also be written as follows:
T0=1 (step 31)
T1=M (step 31)
For i=k−1 to 0 (steps 32 to 38):
  Draw $r_i$
  b=1−$d_i$
  Tb=T0.T1 (mod $r_i$N)
  T$d_i$=T$d_i$.T$d_i$ (mod $r_i$N)
End of loop (output Y of block 34)
Return to T0 (mod N) (step 39).

Changing random number $r_i$ at each iteration of the loop masks the calculation differently for each iteration of the loop. Thus, the analysis of the trace in a horizontal attack becomes useless.

Another advantage of an embodiment is that this countermeasure is also efficient in the case of vertical attacks.

Various embodiments have been described. Various alterations and modifications will occur to those skilled in the art. In particular, the register denomination is arbitrary and may be inverted. The practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing, using an electronic circuit, a modular exponentiation calculation on a first number and an exponent, modulo a first modulo by, for each bit of the exponent:
generating a random number;
performing a modular multiplication of content of a first memory location by content of a second memory location, and placing a result in one of the first and second memory locations selected according to a state of the bit of the exponent; and
performing a modular squaring of the content of one of the first and second memory locations selected according to the state of the exponent, and placing the result in this selected register or memory location,
the multiplication and squaring operations being performed modulo a product of the first modulo and said random number.

2. The method of claim 1 wherein a result of the modular exponentiation calculation is contained in said first memory location.

3. The method of claim 1, comprising:
initializing the first memory location to value 1; and
initializing the second memory location to a value of the first number.

4. The method of claim 1 wherein the first memory location is a first register of the electronic circuit and the second memory location is a second register of the electronic circuit.

5. The method of claim 1, comprising processing a transaction based on a result of the modular exponentiation calculation.

6. A device, comprising:
one or more memories; and
processing circuitry, which, in operation, performs a modular exponentiation calculation on a first number and an exponent, modulo a first modulo by, for each bit of the exponent:
generating a random number;
performing a modular multiplication of content of a first memory location by content of a second memory location, and placing a result in one of the first and second memory locations selected according to a state of the bit of the exponent; and
performing a modular squaring of the content of one of the first and second memory locations selected according to the state of the exponent, and placing the result in this selected register or memory location, the multiplication and squaring being performed modulo a product of the first modulo and said random number.

7. The device of claim 6 wherein a result of the modular exponentiation calculation is contained in said first memory location.

8. The device of claim 6 wherein the processing circuitry, in operation:
initializes the first memory location to value 1; and
initializes the second memory location to a value of the first number.

9. The device of claim 6 wherein the first memory location is a first register of the one or more memories and the second memory location is a second register of the one or more memories.

10. The device of claim 6, comprising one or more processing cores, which, in operation, process transactions based on a result of the modular exponentiation calculation.

11. A system, comprising:
one or more processing cores, which in operation, process digital data; and
cryptographic circuitry, coupled to the one or more processing cores, wherein the cryptographic circuitry, in operation, performs a modular exponentiation calculation on a first number and an exponent, modulo a first modulo by, for each bit of the exponent:
generating a random number;
performing a modular multiplication of content of a first memory location by content of a second memory location, and placing a result in one of the first and second memory locations selected according to a state of the bit of the exponent; and
performing a modular squaring of the content of one of the first and second memory locations selected according to the state of the exponent, and placing the result in this selected register or memory location, the multiplication and squaring being performed modulo a product of the first modulo and said random number.

12. The system of claim 11 wherein a result of the modular exponentiation calculation is contained in said first memory location.

13. The system of claim 11 wherein the cryptographic circuitry, in operation:
   initializes the first memory location to value 1; and
   initializes the second memory location to a value of the first number.

14. The system of claim 11 wherein the first memory location is a first register of the cryptographic circuitry and the second memory location is a second register of the cryptographic circuitry.

15. The system of claim 11 wherein the one or more processing cores, in operation, process a transaction based on a result of the modular exponentiation calculation.

16. A non-transitory computer-readable medium having contents which cause one or more processing devices to perform a method, the method comprising:
   performing a modular exponentiation calculation on a first number and an exponent, modulo a first modulo by, for each bit of the exponent:
   generating a random number;
   performing a modular multiplication of content of a first memory location by content of a second memory location, and placing a result in one of the first and second memory locations selected according to a state of the bit of the exponent; and
   performing a modular squaring of the content of one of the first and second memory locations selected according to the state of the exponent, and placing the result in this selected register or memory location, the multiplication and squaring operations being performed modulo a product of the first modulo and said random number.

17. The non-transitory computer-readable medium of claim 16 wherein a result of the modular exponentiation calculation is contained in said first memory location.

18. The non-transitory computer-readable medium of claim 16, wherein the method comprises:
   initializing the first memory location to value 1; and
   initializing the second memory location to a value of the first number.

19. The non-transitory computer-readable medium of claim 16, wherein the method comprises processing a transaction based on a result of the modular exponentiation calculation.

* * * * *